Aug. 26, 1952 T. N. MULVIHILL 2,608,006
EDUCATIONAL TOY
Filed Jan. 18, 1951
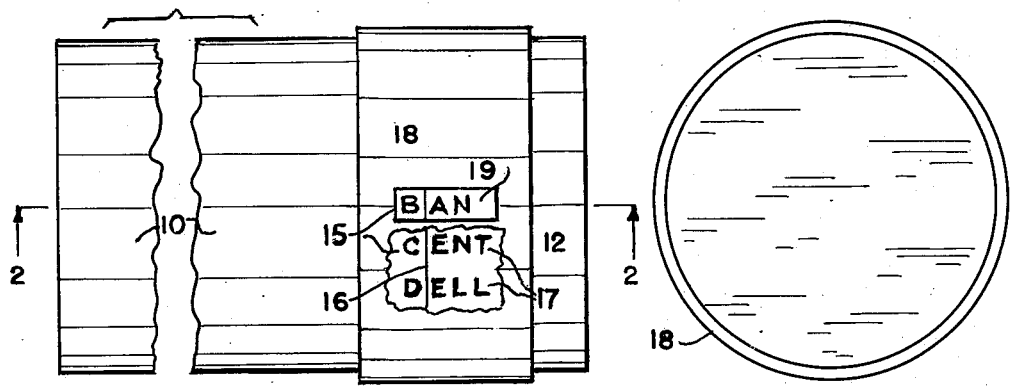
FIG. 1
FIG. 3
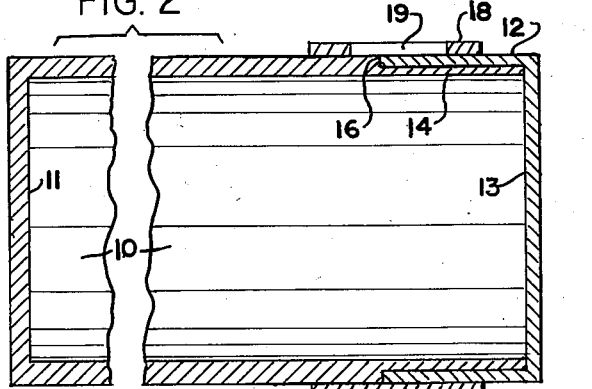
FIG. 2
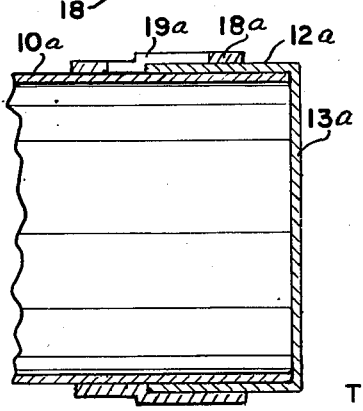
FIG. 4
INVENTOR.
THOMAS N. MULVIHILL
BY
Anderson & Muller
ATTORNEYS Patented Aug. 26, 1952

2,608,006

UNITED STATES PATENT OFFICE 2,608,006

EDUCATIONAL TOY

Thomas N. Mulvihill, Grand Junction, Colo.

Application January 18, 1951, Serial No. 206,596

1 Claim. (Cl. 35—77)

This invention relates to educational toys and more particularly to toys for teaching juveniles spelling, orthoepy and arithmetic.

One of the objects of the invention is to provide a pair of relatively rotatable cylindrical members having juxtaposed letters or numerals on their peripheries which may be aligned to form words or numbers.

Another object is to provide the cylinders with a relatively rotatable cylindrical ring-like member which permits only one word or number to be viewed at any one time.

Another object is to construct the device in the form of a container having a removable end wall, whereby various articles may be stored in the container.

Still further objects, advantages, and salient features will become more apparent from the description to follow, the appended claim, and the accompanying drawing, in which:

Figure 1 is a side elevation of the device, certain portions being broken away;

Figure 2 is a section taken on line 2—2, Fig. 1;

Figure 3 is an elevation of either end of Fig. 1; and

Figure 4 is a section, similar to Fig. 2, showing an alternative form of the invention.

Referring in detail to the drawing, and particularly Figures 1 to 3, the device comprises a cylindrical tube 10, closed at one end by a circular end wall 11, and a second tube 12, similarly closed at one end by an end wall 13. Tube 12 telescopes over a tubular portion 14 on tube 10, of reduced diameter, and is rotatable relative thereto.

Tube 10 is provided with a peripherally extending set of characters, such as letters 15 of the alphabet, at one side of a plane passing through circular line 16, between the tubes, and tube 12 is provided with a similar set of certain combinations of letters 17, at the other side of the plane. As shown in Figure 1, letters "B," "C," and "D" may be aligned with the combinations of letters "AN," "ENT" and "ELL" to spell the words "BAN," "BENT," "BELL," "CAN," "CENT," "CELL," "DAN," "DENT," "DELL." It will be apparent that the entire alphabet, or any portion thereof, may be employed completely around tube 10, or partially therearound, and any letter or combination of letters similarly employed on tube 12. The particular letters chosen on the two tubes should be such that the various aligned combinations will form as great a number of words as possible, these words preferably being simple ones which form the vocabulary of a juvenile user. It will be apparent, also, that characters, such as numbers, may be employed in lieu of letters, or the characters may be partly letters and partly numbers. Thus, for example, numbers 0 through 9 may be employed on each tube and with such combination all numbers from 0 to 99 may be formed.

A tubular ring 18 surrounds tubes 10 and 12 and is rotatable relative thereto, this ring being provided with an aperture 19, forming a window, so that only one word or number may be viewed at a time. As shown in Figure 1, the only word visible is the word "BAN." This ring renders the use of the device less confusing to the juvenile user since attention must be focused on only a single word or number.

In operation, tube 10 is held in one hand, for example the left hand, and ring 18 rotated to expose a particular letter of the alphabet, such as "B." The slight pressure of the hand, or a finger thereof, prevents relative rotation between tube 10 and ring 18. Tube 12 is then rotated by the other hand to expose a combination of letters thereon, and in the examples above given, the words "BAN," "BENT," and "BELL" may be formed within the window. If numbers are being formed, instead of words, the operation is, of course, the same.

In Figure 4 a slight modification is illustrated wherein tube 12a, having end wall 13a, telescopes over tube 10a, but the latter is not formed with the shoulder construction adjacent line 16, as shown in Figure 1, the outer surfaces of the two tubes being slightly offset rather than a single surface. Ring 18a, having window 19a, is slightly offset, also, as illustrated so that it surrounds both tubes.

In either construction, the device may be made of any suitable material. In its most simple and economical form the material may be cardboard, or the like, such as is employed in conventional mailing tubes or similar packages for toys, candies, foods, or any other articles. The tube end walls prevent collapsing of the tubes, and as previously mentioned, also form a closed container with a removable lid. Any other material such as a plastic, wood, or metal may also be employed, and if desired, a portion or all of members 10, 11, 12 and 13 may be transparent so that any contents therein may be visible. Ring 18 preferably should be opaque, however, so that only one pair of aligned characters on the respective tubes may be viewed at one time. Where the container feature is not desired, relatively rotatable members 10, 11 and 12, 13 may be formed as a pair of solid disks, or the like, disposed in face to face relation and journalled for relative rotation about a common axis, such as by an axially extending pin, or other journal means. While the characters have been described as either letters or figures, the term "characters," as hereinafter employed in the claim, is intended to define any partial representation of an entity, the alignment of the partial representations forming a representation of the entity. The characters may be printed, embossed, engraved, or otherwise formed on the relatively rotatable members 11, and 12. Ring 18, if desired, may be constructed of flexible or resilient material so that it can be distorted and stored inside the relatively rotatable members when it is not in use. Many modifications will become apparent within the purview of the invention and the illustrations are therefore to be regarded as exemplary only, and the invention not limited thereto except as defined by the scope of the appended claim.

I claim:

In a toy, a cylindrical container having one end open, a cover closing the open end thereof, the container and cover being relatively rotatable about their common axis, the container and cover having, respectively, normally left and right peripheral portions disposed on opposite sides of a plane perpendicular to said axis, peripherally extending individual letters on the container portion, each letter forming the first letter of a predetermined word, peripherally extending groups of aligned and relatively immovable letters on the cover portion, each group forming the remaining letters of a predetermined word, a third rotatable tubular member having a window carried thereby, surrounding the adjacent portions of the container and cover and covering the letters except at the window, the third member, when rotated to selected positions relative to the container and the cover, while the latter two members are in fixed relation, adapted to expose at the window certain predetermined words, the cover, when rotated to selected positions relative to the container and third member, while the latter two members are in fixed relation, adapted to expose at the window other different predetermined words, and the container member, when rotated to selected positions, with the cover and third members in fixed relation, adapted to expose at the window still different predetermined words.

THOMAS N. MULVIHILL.

REFERENCES CITED

The following references are of record in the file of this patent:

UNITED STATES PATENTS

| Number | Name | Date |
| --- | --- | --- |
| 69,482 | Richardson et al. | Oct. 1, 1867 |
| 305,585 | Forrest | Sept. 23, 1884 |
| 375,095 | Pollard | Dec. 20, 1887 |
| 407,374 | Smith | July 23, 1889 |
| 483,138 | Covington | Sept. 27, 1892 |
| 613,432 | Szehnak | Nov. 1, 1898 |
| 702,615 | Barden | June 17, 1902 |
| 731,175 | Goodman | June 16, 1903 |
| 969,429 | Warfield | Sept. 6, 1910 |
| 1,224,742 | Hillyer | May 1, 1917 |
| 1,378,893 | Newell | May 24, 1921 |
| 1,391,986 | Smith | Sept. 27, 1921 |
| 1,720,499 | Walker | July 9, 1929 |
| 2,411,717 | Fay et al. | Nov. 26, 1946 |
| 2,461,926 | Russell | Feb. 15, 1949 |
| 2,476,194 | Hollowell | July 12, 1949 |